(No Model.)
N. E. BRADFORD.
VEHICLE BRAKE.
No. 498,841. Patented June 6, 1893.
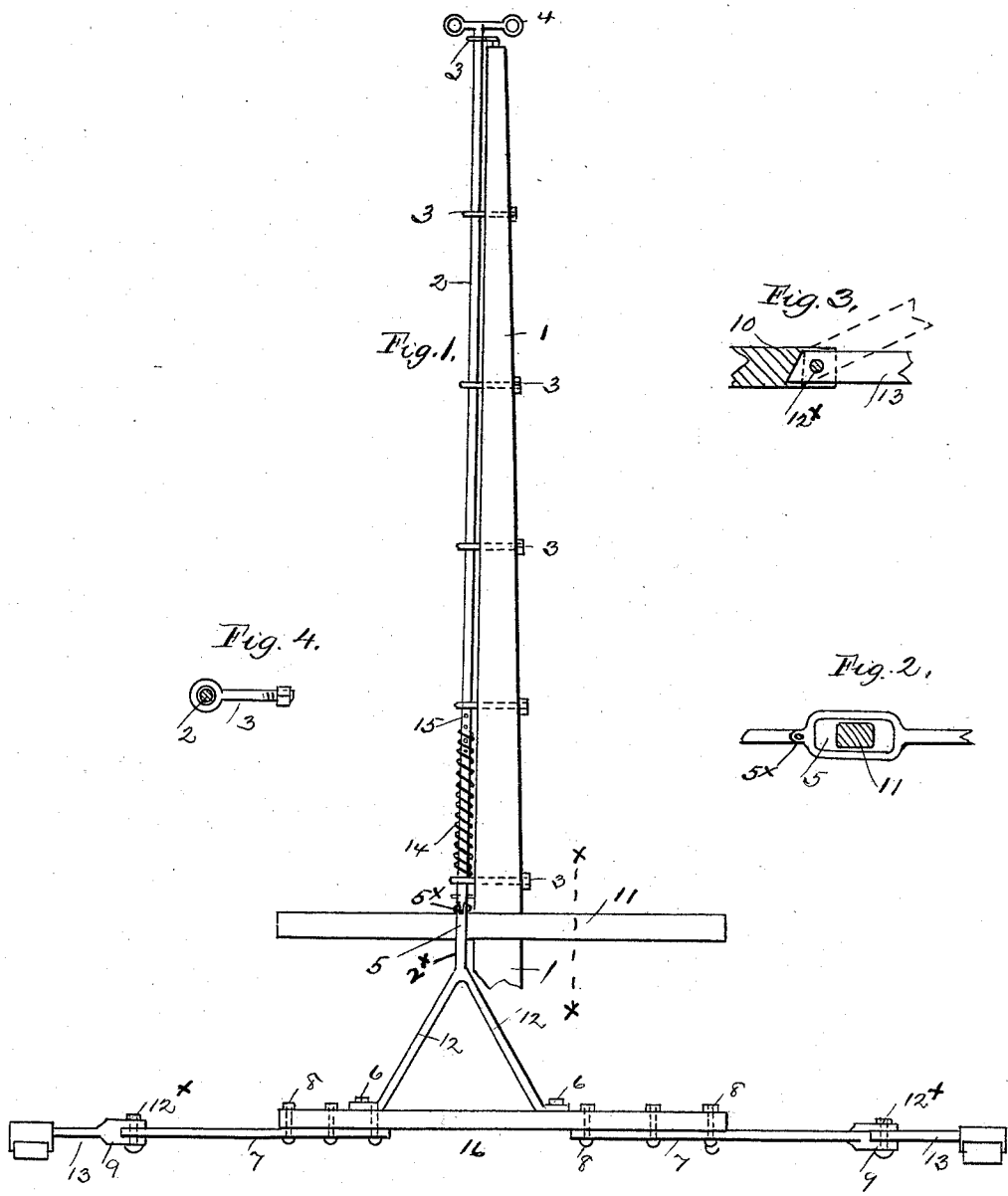

UNITED STATES PATENT OFFICE.

NELSON E. BRADFORD, OF PITTSBURG, PENNSYLVANIA.

VEHICLE-BRAKE.

SPECIFICATION forming part of Letters Patent No. 498,841, dated June 6, 1893.

Application filed June 28, 1892. Serial No. 438,342. (No model.)

*To all whom it may concern:*

Be it known that I, NELSON E. BRADFORD, a citizen of the United States, residing at Pittsburg, in the county of Allegheny and State of Pennsylvania, have invented certain new and useful Improvements in Vehicle-Brakes; and I do hereby declare the following to be a full, clear, and exact description of the invention, such as will enable others skilled in the art to which it pertains to make and use the same, reference being had to the accompanying drawings, which form a part of this specification.

My invention relates to certain improvements in vehicle brakes and particularly to that class of such brakes which are adapted to be automatically operated by the backing of the horses and the object of my invention is to provide an improved construction of such brakes whereby the wagon or other vehicle to which the brake is applied may be "backed" without the operation of the brakes all as will be more fully hereinafter set forth.

The novel features of my invention will be carefully defined in the claim.

In order that my improvements may be the better understood, I have illustrated in the accompanying drawings a vehicle brake constructed according to my invention of which drawings—

Figure 1 is a plan view of the pole of a buggy or carriage provided with my improved brake, and Fig. 2 is a detail sectional view taken along line $x,x$, in said figure. Fig. 3 is a sectional elevation of one of the joints of the rubber bar and Fig. 4 is a side elevation of one of the eye bolts used to hold the device in position.

In these views 1 represents the carriage pole secured in any preferred manner to the framing (not shown) and 11 represents the double tree.

2 is the main rod of my improved braking mechanism which rod is secured to one side of the pole 1 by means of eye bolts 3, 3, of the form seen in Fig. 4. The front end of the rod 2 is forked as seen at 4 each of such forks being provided with a loop or eye for attaching to the harness of the horses. At its rear end said rod 2 is jointedly connected to a bifurcated rod $2^\times$ the branches 12, 12 of which extend sidewise and are joined at 6, 6 to the brake bar 16 extending transversely across the vehicle and bearing on each end an extension bar 7, rigidly secured thereto by bolts 8. The ends of the bars 7 are provided with forks 9, 9, in each of which is pivoted a rubber bar 13 by means of a bolt $12^\times$, said rubber bar being provided with a rubber at its end adapted to bear on the periphery of the wheel when the brakes are applied. The rubber bar is thus free to rise as indicated in dotted lines in Fig. 3 but in order to prevent said bar from falling below a horizontal position (for purposes to be hereinafter set forth) I provide the inner face 10 of the recess formed by the bifurcations 9, with an inward and downward bevel as clearly seen in Fig. 3 and form the end of the rubber bar 13 with a corresponding inward and downward bevel whereby said bevels engage with one another when the rubber bars assume a horizontal position and prevent the latter from falling below the horizontal.

Arranged about the rod 2 in advance of the rear eye bolt 3 is a spiral spring 14 one end of which abuts against said eye bolt and the other end of which engages one of a series of eyes or perforations 15 formed in the rod 2 by means of which series of eyes the tension of said spring may be adjusted.

The operation is as follows:—The horses being harnessed to the vehicle and the harness of each connected to one of the forks 4 of the rod 2 the brake is ready for operation. When the vehicle is going down hill the brakes will be automatically applied by the holding back of the horses against the vehicle or when the driver reins in the horses the brakes will also be automatically applied. It will also be seen that in backing the horses the wheel will revolve in the opposite direction and consequently although the rubbers of the brakes are applied to the tires, the rubber bars will be raised on their pivots as seen in dotted lines in Fig. 3 by such reverse revolution. By reason of the inward and downward bevels on the faces of the extension bar 7 and rubber bar 13, however, it is not possible to press said rubber bars below a horizontal position.

In order to properly guide the mechanism I prefer to provide the rear forked portion $2^\times$ of the rod 2 with an eye 5, as clearly seen in Fig. 2, said eye embracing the double tree and in order to provide for the vertical movement of the pole I provide the hinge $5^\times$ at the connection of the rods 2 and $2^\times$, whereby when said pole falls the spring 14 will be compressed and the rod 2 $2^\times$ will adjust itself to the changed conditions. Otherwise this rod would be broken or bent by the dropping of the pole.

Having thus described my invention, I claim—

The combination with a carriage having a pole or the like of a rod 2 attached thereto and longitudinally movable thereon and provided with means for attachment to the harness of the horses, the bar $2^\times$ jointedly connected to the end of bar 2, a retracting spring for said bars, the bar 16 connected to bar $2^\times$, the extension bars 7, secured to bar 16 and having forked ends, the rubber bars 13 pivoted in the forks of bars 7 and having rubbers adapted to engage the wheels, the adjacent surfaces of said extension bars and rubber bars being provided with downward and inward bevels adapted to engage when said rubber bars assume their horizontal position, substantially as set forth.

In testimony that I claim the foregoing I hereunto affix my signature this 21st day of May, A. D. 1892.

NELSON E. BRADFORD. [L. S.]

In presence of—
   JAS. J. MCAFEE,
   M. E. HARRISON.